United States Patent
Smith et al.

(10) Patent No.: US 8,733,990 B2
(45) Date of Patent: May 27, 2014

(54) LOW PROFILE SWITCHING AND LIGHTING INTEGRATION WITHIN AN INTERIOR VEHICLE COMPONENT

(75) Inventors: Nels R. Smith, Zeeland, MI (US); Michael Catlin, Holland, MI (US); Stephen J. Gwinnup, Spring Lake, MI (US); Rodney J. Tindall, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 191 days.

(21) Appl. No.: 13/508,823

(22) PCT Filed: Nov. 9, 2010

(86) PCT No.: PCT/US2010/056058
§ 371 (c)(1),
(2), (4) Date: May 9, 2012

(87) PCT Pub. No.: WO2011/059982
PCT Pub. Date: May 19, 2011

(65) Prior Publication Data
US 2012/0230047 A1    Sep. 13, 2012

Related U.S. Application Data (60) Provisional application No. 61/259,869, filed on Nov. 10, 2009.

(51) Int. Cl.
*B60Q 3/02* (2006.01)

(52) U.S. Cl.
USPC .......................................... 362/490; 362/488

(58) Field of Classification Search
USPC ................................................. 362/488, 490
See application file for complete search history.

(56) References Cited

U.S. PATENT DOCUMENTS 3,968,355 A * 7/1976 Smallegan .................... 362/642
5,887,929 A   3/1999 Miller et al.
(Continued)

FOREIGN PATENT DOCUMENTS

| JP | 62-264522 A | 11/1987 |
| JP | 2005-327697 A | 11/2005 |
| JP | 2008-049826 A | 3/2008 |

OTHER PUBLICATIONS

International Search Report dated Jan. 18, 2011 as received in corresponding PCT Application No. PCT/US2010/056058, 2 pages.

(Continued)

*Primary Examiner* — Stephen F Husar
*Assistant Examiner* — James Cranson, Jr.
(74) *Attorney, Agent, or Firm* — Foley & Lardner (57) ABSTRACT

An interior vehicle component comprises a base and a panel coupled to the base. The panel is moveable between a first position and a second position. The panel has a first side and an opposite second side. The first side is configured to be visible to a vehicle occupant when the panel is in the first position. The second side cooperates with the base to define a cavity. The panel has an aperture extending through the first side and the second side. The panel also comprises at least one of a solid state switch and a light source supported at the first side of the panel, and a flexible circuit coupled to a backside of the at least one of the solid state switch and the light source through the aperture.

16 Claims, 8 Drawing Sheets

(56) References Cited

U.S. PATENT DOCUMENTS

| | | | |
|---|---|---|---|
| 6,003,925 A | 12/1999 | Litke et al. | |
| 6,945,678 B2 * | 9/2005 | Sugihara et al. | 362/490 |
| 7,422,352 B2 * | 9/2008 | Sakakibara | 362/490 |
| 7,993,042 B2 * | 8/2011 | Padilla | 362/488 |
| 8,283,575 B2 * | 10/2012 | Chuo et al. | 174/268 |
| 2008/0130272 A1 * | 6/2008 | Waters | 362/106 |
| 2011/0222302 A1 * | 9/2011 | Hodgson et al. | 362/490 |

OTHER PUBLICATIONS

Notice of Reasons for Rejection dated Jul. 16, 2013, as received in corresponding Japanese Patent Application No. 2012-538913, and an English language translation of the same (6 pages).

* cited by examiner

LOW PROFILE SWITCHING AND LIGHTING INTEGRATION WITHIN AN INTERIOR VEHICLE COMPONENT

CROSS REFERENCE TO RELATED APPLICATIONS

The present application is a National Stage of International Application No. PCT/US2010/0056058 filed on Nov. 9, 2010, which claims the benefit of U.S. Provisional Patent Application No. 61/259,869 filed on Nov. 10, 2009, the entire disclosures of which are incorporated herein by reference. reby

BACKGROUND

The present disclosure relates generally to an interior vehicle component and to methods of manufacturing such an interior vehicle component. The present disclosure more specifically relates to an interior vehicle component having at least one user interface (e.g., button, switch, control, etc.) and/or at least one light source and to methods of supporting the user interface and/or light source within the interior vehicle component.

Overhead consoles are just one type of an interior vehicle component that can provide one or more storage compartments for storing items, such as sunglasses, remote control devices, hand-held portable phones and wireless communication devices, etc. Overhead consoles can also provide a support structure for one or more light sources (e.g., dome light, task light, backlighting, etc.) and/or one or more other functional devices that may find utility within the vehicle (e.g., display screens, HVAC equipment, etc.). To operate these light sources and other functional devices, the overhead console may further include one or more user interfaces that are configured to be selectively actuated by a user. Conventional user interfaces are quite thick and bulky, while packaging space for an overhead console is at a premium. As such, there continues to be a need to improve the integration of such user interfaces and light sources within an interior vehicle component (e.g., an overhead console, etc.) and/or to improve the assembly of an interior vehicle component having user interfaces and/or light sources.

SUMMARY

One embodiment of the invention relates to an interior vehicle component. The interior vehicle component comprises a base and a panel coupled to the base. The panel is moveable between a first position and a second position. The panel has a first side and an opposite second side. The first side is configured to be visible to a vehicle occupant when the panel is in the first position. The second side cooperates with the base to define a cavity. The panel has an aperture extending through the first side and the second side. The panel also comprises at least one of a solid state switch and a light source supported at the first side of the panel, and a flexible circuit coupled to a backside of the at least one of the solid state switch and the light source through the aperture.

Another embodiment of the invention relates to a method of manufacturing an interior vehicle component. The method comprises providing a base and coupling a panel to the base in a manner so that the panel can be selectively moved between a stowed position and a deployed position. The panel has a first side and an opposite second side. The first side is configured to be visible to a vehicle occupant when the panel is in the stowed position. The second side cooperates with the base to define a cavity. The panel has an aperture extending through the first side and the second side. The method also comprises coupling at least one of a solid state switch and a light source a panel to the panel that is accessible at the first side of the panel. The method further comprises coupling a flexible circuit a backside of the at least one of the solid state switch and the light source through the aperture.

Another embodiment of the invention relates to an overhead console for a vehicle. The overhead console comprises a housing and at least one a storage compartment supported at the housing that is configured to be selectively moved between a stowed position and a use position. The overhead consoles further comprises at least one of a light source and a user interface supported on the storage compartment that does not encroach or substantially limit the available storage capacity of the storage compartment. In one particular embodiment, the storage compartment is a storage bin configured to receive and retain a pair of sunglasses. The storage bin is coupled to the housing about a pivot shaft that allows for the rotational movement of the storage bin between the stowed position and the use position. In another particular embodiment, the at least one user interface comprises multiple solid stated switches, such as capacitive switches or field effect switches, that are provided on an A-surface of the storage bin. In such an embodiment, a flexible circuit is routed between the solid state switches and a circuit board supported on the housing. The switches may be supported on the A-surface forward of a rotation axis of the storage bin so that a push/push type latch may still be used to actuate the storage bin between the stowed position and the use position. In another particular embodiment, the at least one light source comprises a low profile LED provided on an A-surface of the storage bin.

Another embodiment of the invention relates to a vehicle having an overhead console supported within the vehicle. The overhead console comprises a housing and at least one a storage compartment supported at the housing that is configured to be selectively moved between a stowed position and a use position. The overhead consoles further comprises at least one of a light source and a user interface supported on the storage compartment that does not encroach or substantially limit the available storage capacity of the storage compartment.

Another embodiment of the invention relates to a method of assembling an overhead console for a vehicle. The method comprises providing a housing defining a recess configured to receive a storage compartment. The method also comprises supporting the storage compartment within the recess so that the storage compartment can be selectively moved between a stowed position and a use position. The method further comprises providing at least one of a light source and a user interface on an A-surface of the storage compartment in a manner that does not encroach or substantially limit the available storage capacity of the storage compartment.

DETAILED DESCRIPTION

Referring to the FIGURES in general, an interior component for use in a vehicle (e.g., automobiles such as cars, trucks, sport utility vehicles, minivans, buses, and the like; airplanes, boats, etc.) is shown according to exemplary embodiments. The interior vehicle component may be installed at any suitable location within a vehicle and integrated with any other vehicle accessories, and may be provided in a wide variety of sizes, shapes, and configurations, and made from a wide variety of materials and manufacturing processes according to various exemplary embodiments. All such variations are intended to be within the scope of the inventions.

For exemplary purposes only, the interior vehicle component is shown and described herein as an overhead console. The overhead console generally includes one or more storage compartments (e.g., bins, receptacles, etc.) that are configured to be selectively moved between a first position and a second position. The one or more storage compartments may be configured to support any of a number of items including, but not limited to, sunglasses, electronic devices, etc. The overhead console also includes one or more user interfaces (e.g., button, switch, control, etc.) that are configured to be selectively actuated by a vehicle occupant to control a functional device (e.g., overhead task lights, entertainment systems, navigation systems, communication systems, HVAC systems, etc.). According to an exemplary embodiment, one or more of the user interfaces are solid state switches (e.g., capacitive sensing switches, field effect switches, etc.) that are integrated with or into an outer surface of a movable storage compartment to provide for a more condensed, a relatively low-profile and easy to manufacture overhead console. Solid state switches can be smaller than mechanical switches and can therefore be provided on the moveable storage compartment without sacrificing the storage capacity of the storage compartment.

The overhead console may optionally include one or more lights (e.g., dome light, task light, background display light, etc.). According to an exemplary embodiment, one or more of the light sources are low profile light sources (e.g., low profile LED, etc.) that are integrated with or into an outer surface of a movable storage compartment to provide for a more condensed, relatively low-profile and easy to manufacture overhead console. In such an embodiment, the light sources may be integrated with the movable storage compartment along with one or more of the user interfaces, or alternatively, may be integrated with the movable storage compartment without also providing a user interface.

It should be noted at the outset that while the disclosed embodiments are illustrated herein as an overhead console, the features of the disclosed embodiments have much wider applicability. For example, the present inventions have equal applicability to other components used within the interior of the vehicle such as a floor console, a side trim or door panel, a visor, an instrument panel and/or any other interior vehicle component having a panel or door that would otherwise be an unusable surface for functional electronics (e.g., switches, light sources, etc.) because of the lack of available space behind the panel or door to support mechanical switching systems and/or bulky lighting systems, etc. The lack of space may be due to a cavity or recess (e.g., storage area, etc.) being provided behind the panel or door that is needed for other purposes and/or because of another panel or structure being positioned directly behind the panel or door. In the case of a floor console (e.g., a center-stack floor console, etc.), the solid state switches and/or the low profile light sources may be provided, for example, on a door concealing a storage area (e.g., a tambour door, etc.). In the case of a side trim or door panel, the solid state switches and/or low profile light sources may be provided, for example, on a panel that forms the outer structure of a map pocket. In the case of visor, the solid state switches and/or low profile light sources may be provided, for example, on an outer surface of a moveable door that conceals a vanity mirror. All such interior vehicle components are intended to be within the scope of the present inventions.

Figure 1:
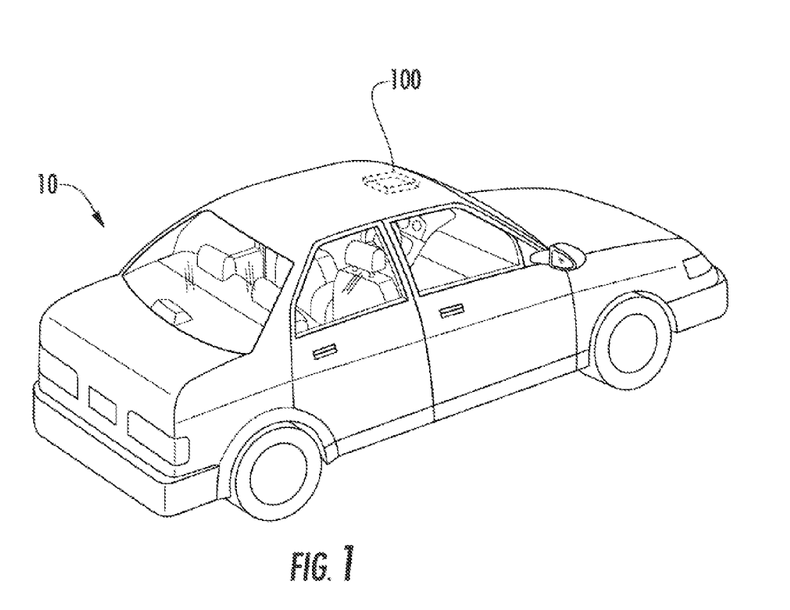
FIG. 1 is an isometric view of a vehicle having one or more interior vehicle components according to an exemplary embodiment.

Referring now to FIG. 1, a vehicle 10 is shown according to an exemplary embodiment that may include a number of subsystems for vehicle operation, user convenience, and/or entertainment. For example, the vehicle 10 may include a heating, ventilation, and air conditioning (HVAC) system, a lighting system, a connectivity system, a sound system, a media system, a navigational system, an entertainment system, a display system, a communications system, or any other vehicle control system.

The vehicle 10 includes an interior vehicle component, shown as an overhead console 100, that is located in an interior of the vehicle 10 at the ceiling of the vehicle near the front window and centrally between a front driver seat and a front passenger seat. According to the various alternative embodiments, the overhead console 100 may be mounted in vehicle 10 at any other vehicle overhead console location (e.g., for a row of seats other than the front row, etc.).

Figure 2:
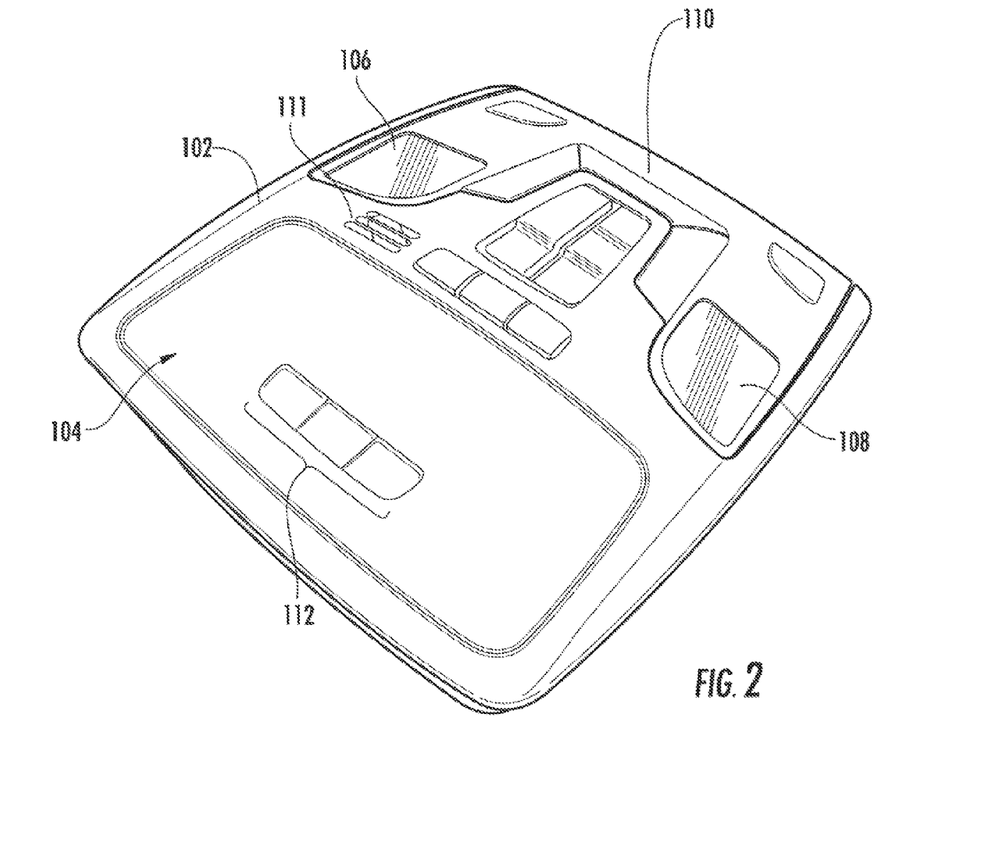
FIG. 2 is an isometric view of an overhead console according to an exemplary embodiment.
Figure 8:
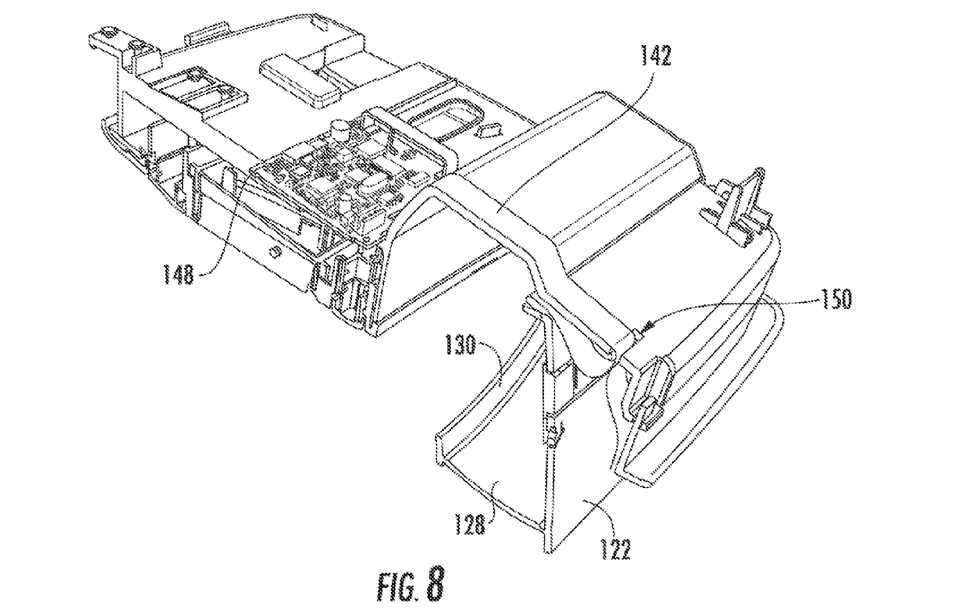
FIG. 8 is a cross sectional top isometric view of the overhead console of FIG. 2 showing the storage bin in a deployed position.
Figure 9:
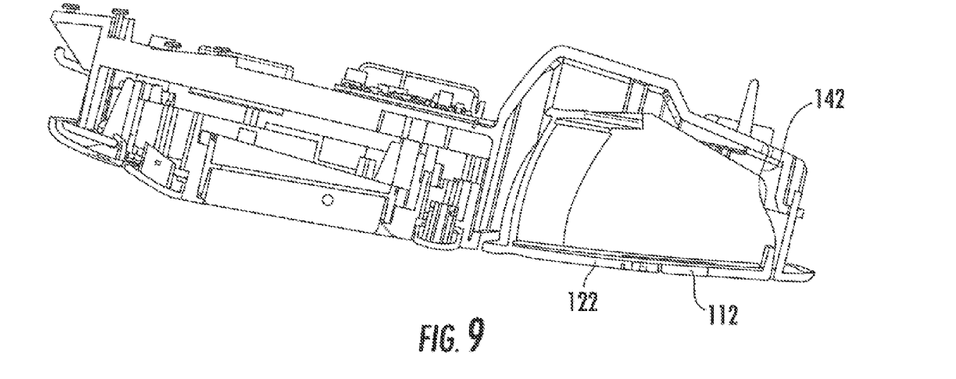
FIG. 9 is a cross sectional side view of the overhead console of FIG. 2 showing the storage bin in a stowed position.
Figure 10:
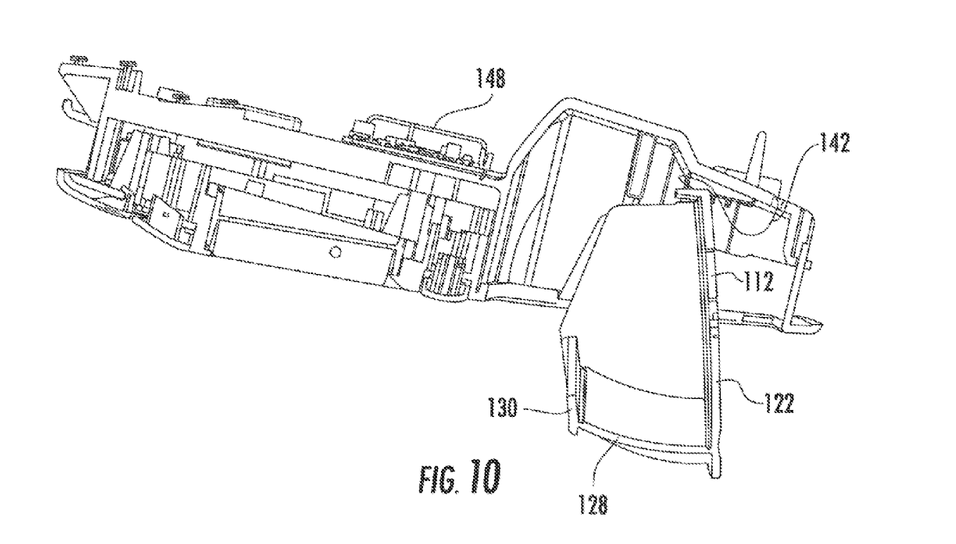
FIG. 10 is a cross sectional side view of the overhead console of FIG. 2 showing the storage bin in a deployed position.

Referring to FIG. 2, the overhead console 100 is shown according to an exemplary embodiment. The overhead console 100 includes a support member (e.g., body, housing, bezel, cover, trim piece, etc.), shown as a base 102, a storage compartment, shown as a storage bin 104, that is configured to be selectively moved between a first or closed position (shown in FIGS. 2, 5, 7 and 9) and a second or use position (shown in FIGS. 6, 8 and 10), a first light, shown as a first task light 106, provided on a first lateral side of the overhead console (e.g., a driver's side, etc.), a second light, shown as a second task light 108, provided on a second lateral side of the overhead console opposite the first lateral side (e.g., a passenger side, etc.), a first set of user interfaces, shown as first switches 110, provided on the base 102 (e.g., eleven switches, etc.) and a second set of user interfaces, shown as second switches 112, provided on the storage bin 104 (e.g., three switches, etc.). The overhead console 104 is also shown as including a speaker 111 that can be coupled to a hands-free phone system configured to communicate with a mobile phone for hands-free use of the mobile phone and/or to other vehicle systems configured to use audio output.

Figure 3:
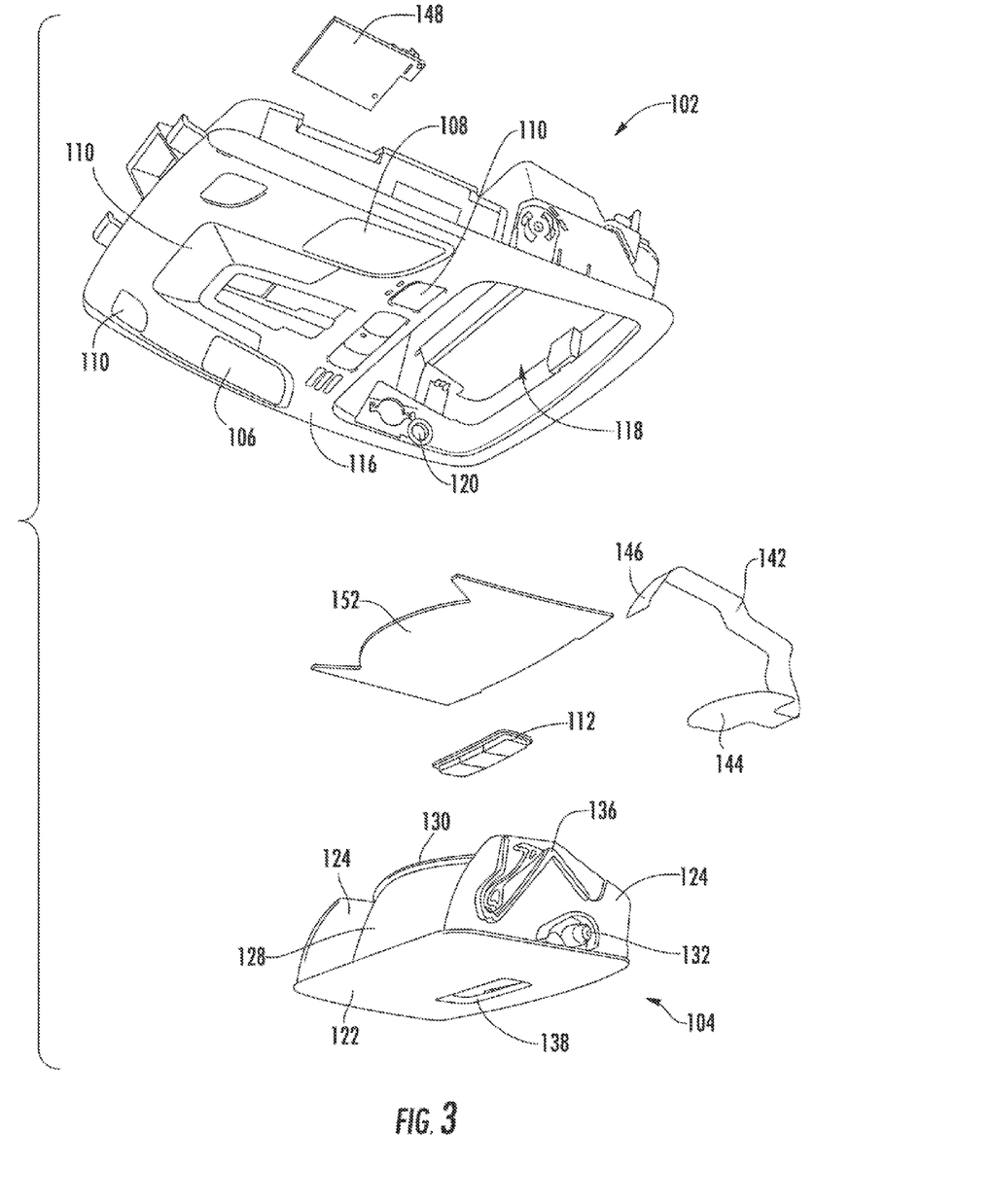
FIG. 3 is an exploded bottom isometric view of the overhead console of FIG. 2.
Figure 4:
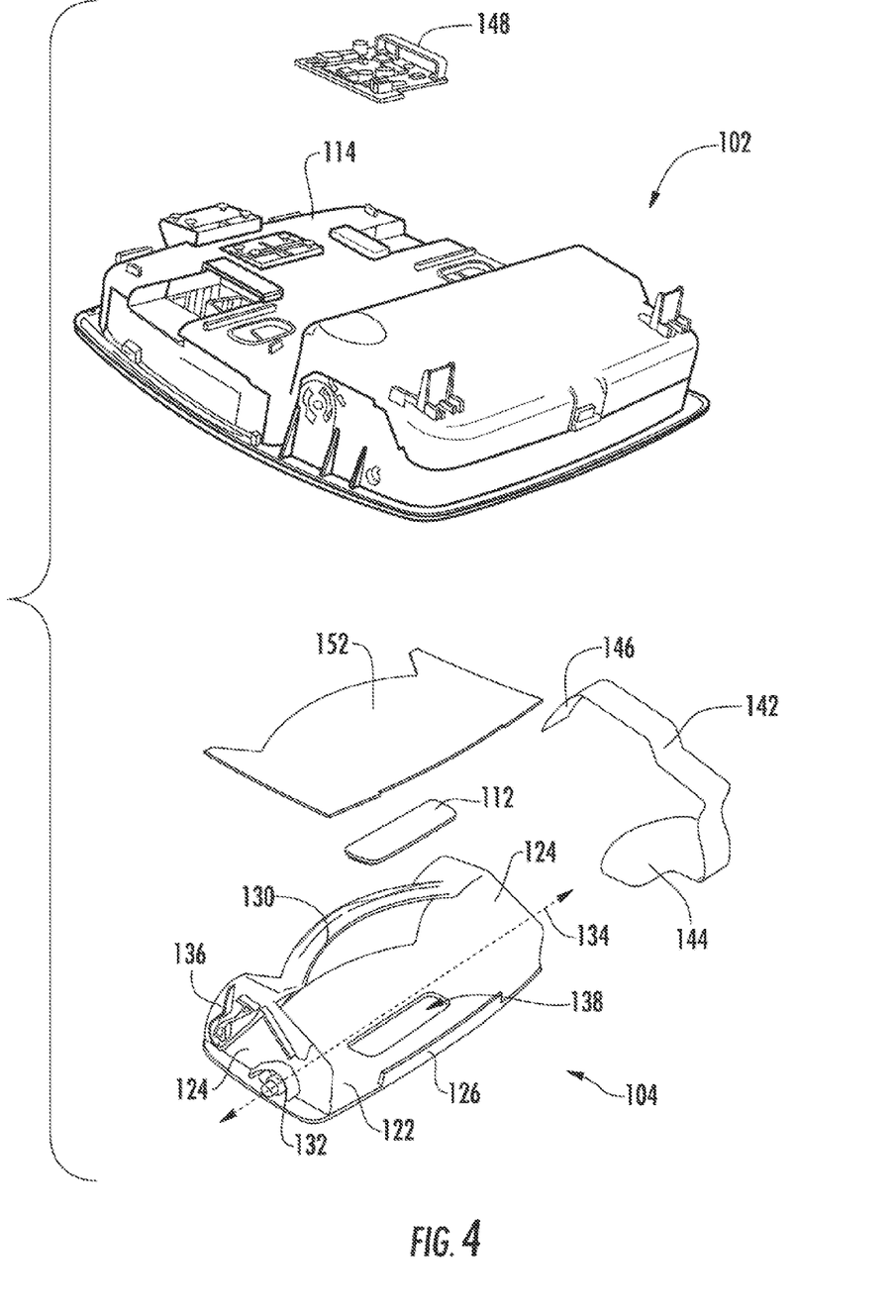
FIG. 4 is an exploded top isometric view of the overhead console of FIG. 2.

FIGS. 3 and 4 show exploded views of the overhead console 100. The base 102 includes a concealed side 114 (e.g., inner side, etc.), shown in FIG. 4, that provides suitable attachment structures (e.g. apertures, clips, bosses, etc.) for mounting the overhead console 100 to the vehicle roof or an intermediate structure (e.g., headliner assembly, sub-frame, roof panel, base, etc.). The base 102 may be coupled to the vehicle 10 in any number of ways. According to various the various alternative embodiments, other fastening methods (e.g., bolts, screws, other locking mechanisms, adhesives, etc.) may be used. The base 102 also includes an exposed side 116 (e.g., outer side, A-surface, etc.) that is configured to generally face the vehicle interior. The exposed side 116 at least partially functions as a trim piece (e.g., bezel, etc.) to at least partially conceal, and to improve the aesthetic appearance of, the overhead console 100 when viewed from an interior portion (e.g. cabin, etc.) of the vehicle 10.

Supported at a rear portion of the exposed side 116 are first task light 106, second task light 108 and first switches 110. First task light 106 and second task light 108 are configured to be aimed toward a vehicle interior location when the overhead console 100 is mounted within the vehicle 10. A user of the vehicle may use first switches 110 to selectively activate first task light 106, second task light 108 and/or any other vehicle component or feature. According to an exemplary embodiment, first switches 110 are solid state switches, and more specifically, capacitive sensing switches, but alternatively may be mechanical switches because there is additional clearance space provided in this area of the base 102 to accommodate the moveable parts of mechanical switches. The base 102 is further shown as defining an aperture or recess 118 at front portion of the overhead console 100 that is configured to receive and support the storage bin 104. According to the embodiment illustrated, a mounting structure 120 is provided at an inner periphery of the recess 118 that allows the storage bin 104 to be rotatably coupled to the base 102.

According to an exemplary embodiment, the storage bin 104 is configured to receive and retain a pair of sunglasses, but alternatively, may be configured to support any of a number of items. The storage bin 104 includes a body having a panel or door, shown as a first wall 122, with an outer surface that is configured form a portion of the lower side face of the overhead console 100 when the storage bin 104 is in the closed position. In such an embodiment, the contour of the outer surface of the first wall 122 corresponds to the contour of the surrounding portions of the base 102 to provide an uncluttered appearance when the storage bin 104 is in the closed position. For example, the outer surface of the first wall 122 is shown as extending in a substantially horizontal direction when storage bin 104 is in the closed position, and at an orientation that is substantially coplanar with the surrounding portions of the base 102.

The storage bin 104 is also shown as having a pair of side walls 124 provided at opposite lateral sides of the first wall 122. Outwardly extending from a front portion of a back surface of the first wall 122 is a second wall 126. Outwardly extending from a rear portion of the back surface of the first wall 122 is a third wall 128. The third wall 128 extends laterally between the side walls 124 and is configured to support a pair of sunglasses (or any other item stored within the storage bin 104) when the storage bin 104 is in the open position. Upwardly extending from a free end of the third wall 128 at an orientation that is substantially perpendicular to the third wall 128 is a fourth wall 130. The fourth wall 130 helps retain the pair of sunglasses in the storage bin 104 when the storage bin 104 is in the open position. The top edge of the fourth wall 130 is curved downward to provide easy access to storage area of the storage bin 104 for a user to facilitate insertion and removal of sunglasses.

The body of the storage bin 104 is preferably a one-piece molded structure formed of a relatively rigid polymer material, with the first wall 122, the side walls 124, the second wall 126, the third wall 128 and the fourth wall 130, respectively, being integrally formed. According to the various alternative embodiments, the body of the storage bin 104 may be formed in any of a number of separate components that are subsequently coupled together.

Supported on an outer surface of the side walls 124, are pivot shafts 132 that are configured to be received by corresponding structures on the base 102 (i.e., mounting structure 120). The pivot shafts 132 define an axis of rotation 134 (shown in FIG. 4) about which the storage bin 104 is configured to rotate between the closed position and the open position. Also supported on the outer surfaces of the side walls 120 are one or more guide elements, shown as projections 136, that are configured to assist in guiding the storage bin 104 as it rotates between the closed position and the open position. The storage bin 104 also includes a latch element configured to retain the storage bin 104 in the closed position.

In use, a user can push upwards on a rear portion of the first wall 122 when the storage bin 104 is in the closed position to release the latch and thereby open the storage bin 104 (i.e., allow the storage bin 104 to rotate downward). Similarly, a user can push on the rear portion of the first wall 122 when the storage bin 104 is in the open position to move the storage bin 104 into the closed position and thereby reengage the latch to retain the storage bin 104 in the closed position. According to the various alternative embodiments, a separate button or switch may be supported on the base 102 for actuating the storage bin 104.

According to an exemplary embodiment, the second switches 112 are formed as a separate member that is coupled to the storage bin 104. To accommodate the second switches 112, the first wall 122 of the storage bin 104 defines one or more apertures (e.g., openings, depressions, etc.), shown as a hole 138, that is configured to receive the second switches 112. According to the embodiment illustrated, the hole 138 extends all the way through the first wall 122 and is configured to receive all of the second switches 112. According to the various alternative embodiment, separate openings may be provided for receiving separate switches. According to still further alternative embodiments, one or more separators (e.g., dividers, projections, etc.) may extend into the hole 138 to visually and/or functionally separate the second switches 112 that share a common opening. The first wall 122 may also define additional openings for receiving components including, but not limited to, overhead light sources, display screens, etc.

According to an exemplary embodiment, the second switches 112 are supported on the first wall 122 at a position so that when a user presses on one the second switches 112, the latch configured to retain the storage bin 104 is not inadvertently actuated. For example, according to the embodiment illustrated, the second switches 112 are positioned towards a front region of the first wall 122 (opposite the region where a user would press on the first wall 122 to actuate the storage bin 104). In particular, the second switches 112 are shown as being supported at least partially forward of the axis of rotation 134 about which the storage bin 104 is configured to rotate. According to the various alternative embodiments, the second switches 112 may be provided anywhere along the first wall 120, including in the rear region of the first wall 122. If switches are provided in this region, the controls for unlatching the storage bin 104 may be moved to a separate button supported on the base 102 as noted above.

Figure 5:
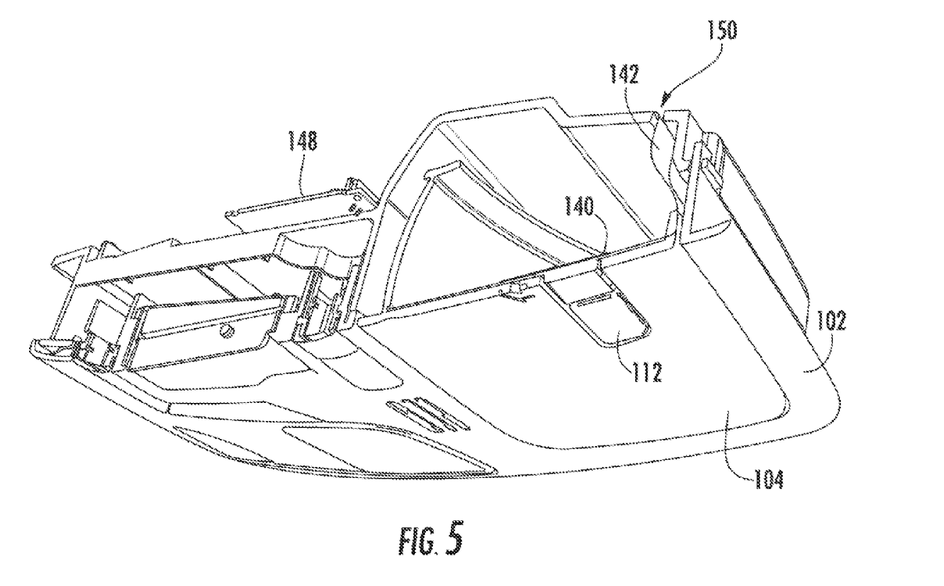
FIG. 5 is a cross sectional bottom isometric view of the overhead console of FIG. 2 showing a storage bin in a stowed position.
Figure 6:
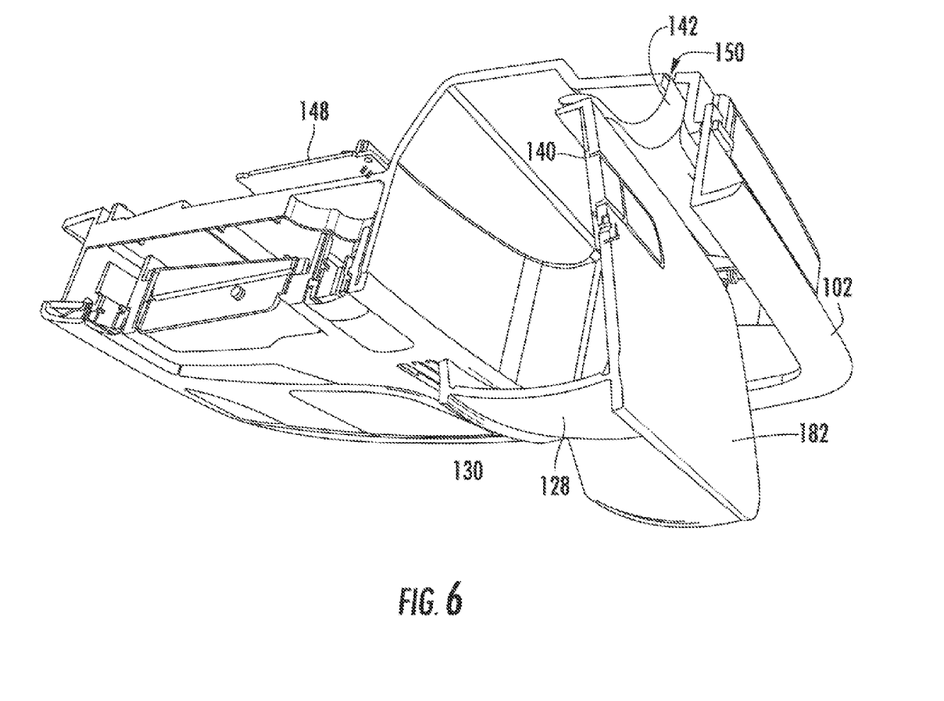
FIG. 6 is a cross sectional bottom isometric view of the overhead console of FIG. 2 showing the storage bin in a deployed position.
Figure 7:
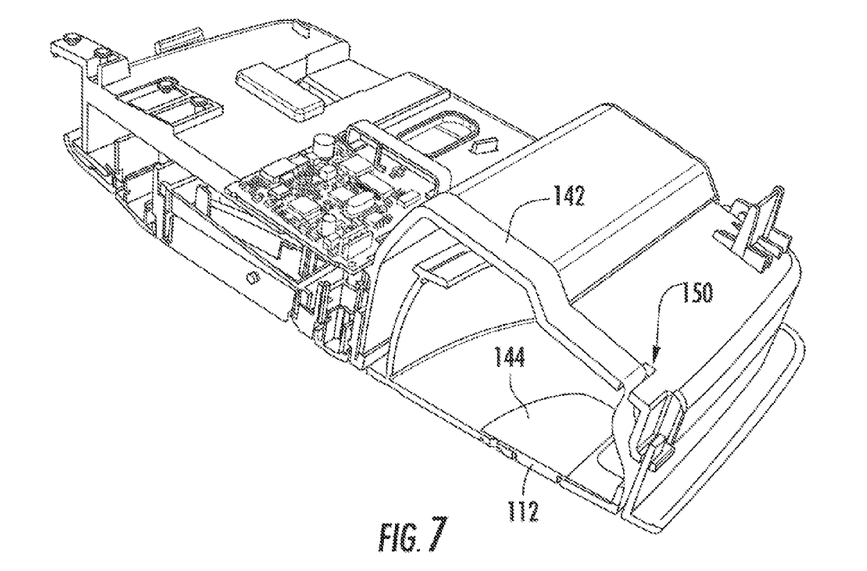
FIG. 7 is a cross sectional top isometric view of the overhead console of FIG. 2 showing the storage bin in a stowed position.

The second switches 112 may be configured for a variety of tasks including controlling first task light 106, second task light 108, other interior lights, short range radio communication equipment (e.g., Bluetooth®, Homelink®, etc.) and/or any other functional device. According to an exemplary embodiment, the second switches 112 are formed as a one-piece switch pad or unit configured to be inserted from a back side of first wall 122. As shown in FIGS. 5 and 6, the second switches 112 include a projection or flange 140 that is configured to engage the back side of first wall 122 to prevent the switches from falling through the opening. As noted above, the second switches 112 are solid state switches that do not require any moving parts. Because the second switches 112 do not require any moving parts, the second switches 112 can be added to the first wall 122 of the storage bin 104 without intruding upon the storage capacity of the storage bin 104. As shown in FIGS. 5 through 10, the second switches 112 have a relatively low profile with an overall thickness that is substantially similar to the thickness of the first wall 122.

According to the various alternative embodiments, the second switches 112 may not be provided as a separate member. For example, the second switches may be integrally molded on the outer surface of the first wall 122. In such an embodiment, a surface finish may be provided to indicate a touch zone that a user may touch in order to operate the second switches. For example the surface finish may provide tactile indication of the switch location by providing a depression and/or one or more ridges at the location of the switch. The surface finish may also be a film material applied to an outer surface of the first wall 122. For example, the film material can be formed from a polycarbonate material, an acrylic material, a cloth material, a leather material, a composite material, a metal material, and/or any other material. According to still further alternative embodiments, one or more light sources may provide backlighting and/or accent lighting to identify a zone for the switch.

According to an exemplary embodiment, the second switches 112 are capacitive switches. During operation of an exemplary capacitive switch, a signal is sent across a conductive pad and the capacitance of the pad is determined. For example, a square wave signal may be provided to the pad. During normal conditions, i.e., when the switch is not being touched, the pad has a low capacitance. As such, a circuit may be provided that quickly charges and drains, such as across a resistor, the pad in tune with the square wave signal. When a foreign object, such as a user's finger, touches or comes within close proximity to the switch, the foreign object increases the capacitance of the pad. The increased capacitance slows the rate at which the pad charges and drains and may be detected by appropriate devices and/or electrical circuits. It should be appreciated that the above-outlined exemplary capacitive switch is just one type of numerous devices that may be referred to as capacitive switches and that may be useful with various exemplary embodiments of trim pieces. Other exemplary capacitive switches have multiple pads and/or conductive paths and may not need to be touched by a foreign object to be triggered. Similarly, other capacitive switches may have flexing or otherwise displaceable surfaces, popples or other functional regions as described in International Application PCT/US08/50287, which is incorporated herein by reference in its entirety. According to the various alternative embodiments, the second switches 112 may be any type of solid state switches including, but not limited to, field effect switches as described in International Application PCT/US09/030017, which is also incorporated herein by reference in its entirety.

Referring back to FIGS. 3 and 4, a flexible circuit 142 (e.g., a flat flexible circuit, a flat flexible cable, a flexible printed circuit board, etc.) is provided having a first end 144 configured to be positioned behind the second switches 112 and a second end 146 coupled to a circuit provided on a printed circuit board 148. According to the embodiment illustrated, the printed circuit board 148 is supported on the concealed side 114 of base 102 rearward of the recess 118. To accommodate the positioning of the printed circuit board 148, the flexible circuit 142 is routed along the concealed side 114 of base 102 until dropping downwards through an opening 150 (shown in FIGS. 5 through 8) provided in a front region of the recess 118. Routing the flexible circuit 142 through a front region of the recess 118 ensures that the flexible circuit 142 will not interfere with the storage area of the storage bin 104. Further, the flexible circuit 142 has a length that provides a sufficient amount of slack so that the flexible circuit 142 will not restrict the rotational movement of the storage bin 104 between the closed position and the open position. According to an exemplary embodiment, the flexible circuit 142 is adhered to the concealed side 114 of base 102, but alternatively, may be coupled thereto using any of a variety of suitable techniques (e.g., fasteners, etc.).

To conceal and protect the first end 144 of flexible circuit 142, a cover layer, shown as a covering 152, inserted along a back side of the first wall 122 after the second switches 112 and the flexible circuit 142 have been installed. The covering 152 may be formed of elastomeric material, such as a thermoplastic elastomer covering or any other suitable material. The covering 152 not only protects the flexible circuit 142, but may also provide a soft support surface for sunglasses positioned in the storage bin 104.

According to another exemplary embodiment, the circuitry for the second switches 112 may be provided substantially behind the second switches 112 rather than being provide remotely on the printed circuit board 148 as detailed above. For example, the circuitry may be provided on the flexible circuit 142, on a semi-rigid circuit board or even a substantially rigid printed circuit board (if the surface on which the second switches 112 are supported is substantially flat and can accept a substantially rigid printed circuit board). Even with the circuitry being provided at or near the switches rather than being provided remotely, it is possible to maintain a relatively thin total thickness for the first wall 122. For example, the total thickness of the first wall 122, including the functional electronics and any circuitry, is less than approximately 10 mm, and is preferably less than approximately 6 mm. According to a preferred embodiment, the total thickness of the first wall 122, including the functional electronics and any circuitry, is less than approximately 5 mm.

Figure 11:
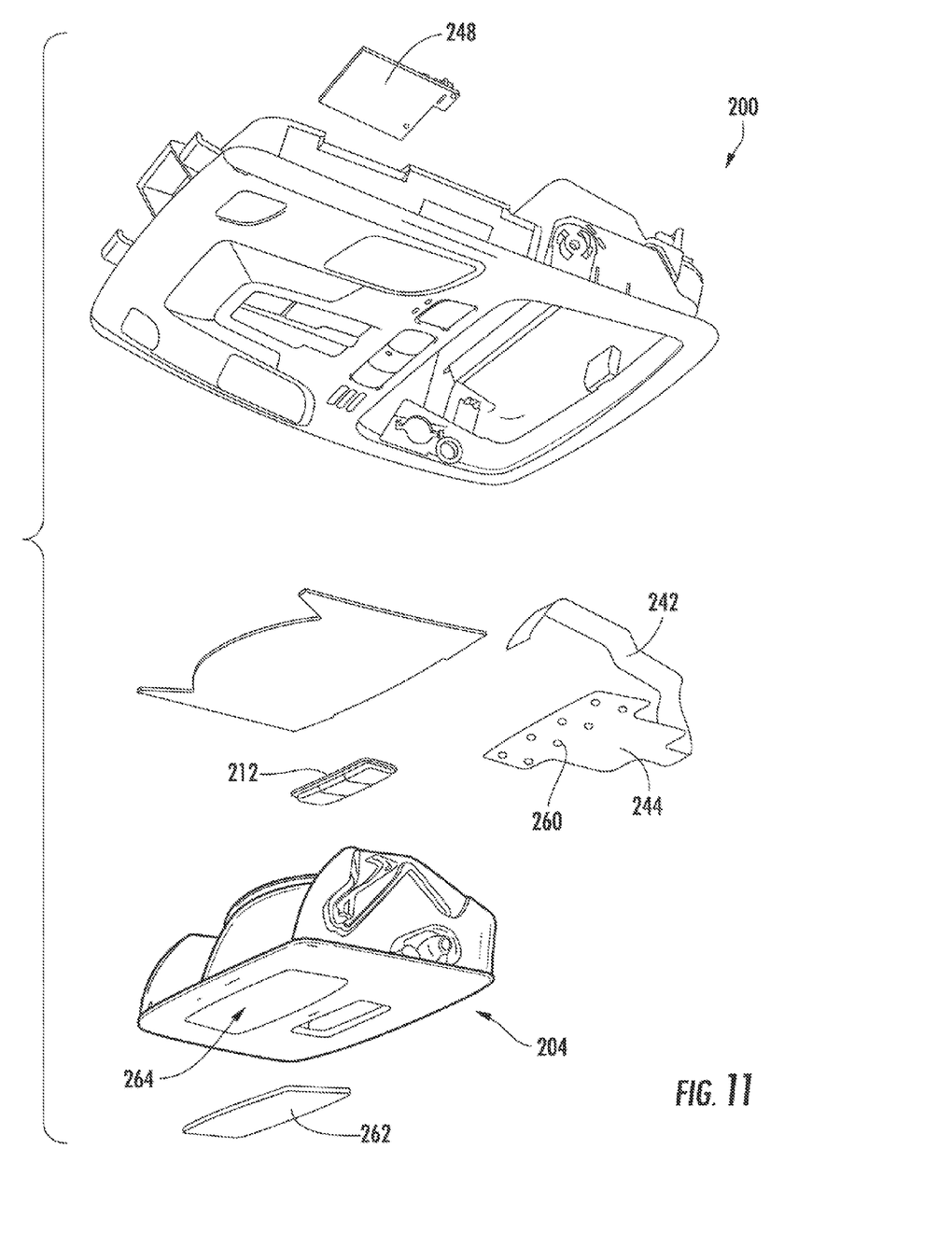
FIG. 11 is an exploded bottom isometric view of an overhead console according to another exemplary embodiment.

Referring to FIG. 11, an overhead console, shown as an overhead console 200, is shown according to an alternative embodiment. The overhead console 200 is substantially similar to the overhead console 100 detailed above. In addition to the subject matter detailed above, the overhead console 200 also includes a light source supported by the storage bin 204 that illuminates a portion of the vehicle interior when the storage bin 204 is in the closed position. According to an exemplary embodiment, the light source comprises one or more light emitting elements, shown as multiple LEDs 260, and a cover, shown as a lens 262, configured to protect the LEDs 260 and/or disperse the light emanating from the LEDs 260. According to the embodiment illustrated, the LEDs 260 are provided on a first end 244 of the flexible circuit 242. In such an embodiment, the same printed circuit board 248 and/or flexible circuit 242 used for controlling the operation of the second switches 212 can be used for controlling the operation of the light source. According to the various alternative embodiments, a separate flexible circuit and/or print circuit board may be provided for the light source.

According to an exemplary embodiment, the light source is supported on the first wall 222 of the storage bin 204 rearward of the second switches 212. To accommodate the light source, the first wall 222 of the storage bin 204 defines one or more apertures (openings, depressions, recesses, etc.), shown as a hole 264, that is configured to receive the lens 262. Any of a number of fastening techniques may be used for securing the lens 262 at the hole 264 (e.g., one or more mechanical fasteners, adhesives, friction fit, interference fit, etc.). According to an exemplary embodiment, the lens 262 is formed of a relatively transparent and/or translucent material, but alternatively may have any of a variety of characteristics for disturbing the light within the vehicle.

According the embodiment illustrated, similar to the second switches 222, the LEDs 260 have a relatively low profile so that the capacity of the storage bin 204 does not need to be sacrificed in order to accommodate the light source. According to the various alternative embodiments, the light source may be provided in any of a variety of shapes, sizes and locations on the first wall 222 of the storage bin 204. According to further alternative embodiments, the light source may be provided on the storage bin 204 without any switches being provided on the storage bin. According to still further alternative embodiments, the LEDs 260 may also be used to provide backlighting for the second switches 222 and/or for any indicia provided on the storage bin 204.

The light source is configured to be selectively controllable by a user between an on position and an off position. According to an exemplary embodiment, one or more of the switches 212 may be used to control the state of the light source. According to the various alternative embodiments, a user interface that is separate from the storage bin 204 may be provided to control the state of the light source. For example, a separate user interface may be provided elsewhere on the overhead console 200 and/or within the vehicle 10.

Figure 12:
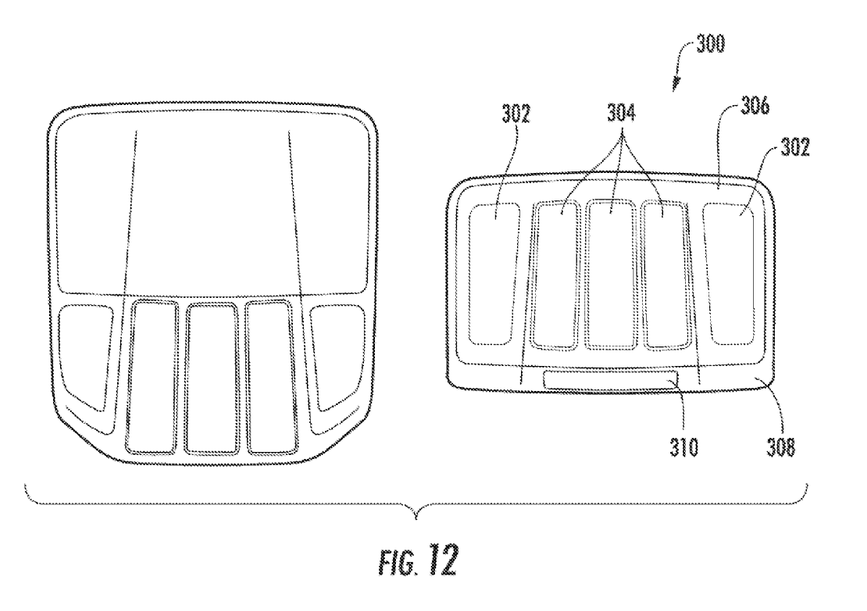
FIG. 12 is a bottom plan view of an overhead console according to another exemplary embodiment.

Referring to FIG. 12, an overhead console, shown as an overhead console 300, is shown according to an alternative embodiment. On the left, a conventional overhead console is shown as including two lights sources and three mechanical switches provided on the base of the overhead console, while nothing is shown on the moveable door of the storage bin. On the right, the overhead console 300 demonstrates how the footprint or package size of a conventional overhead console can be significantly reduced by providing low profile light sources 302 (e.g., LED lights, etc.) and solid state switches 304 (e.g., capacitive switches, field effect switches, etc.) on the moveable door 306 of a storage bin rather than on a base 308 of the overhead console 300. According to the embodiment illustrated, a separate button 310 is provided on the base 308 for releasing a latch and actuating the storage bin between a closed position and an open position. Because of the low profile characteristics of the light sources 302 and the switches 304 as detailed above, the light sources 302 and the switches 304 can be provided on the moveable door 306 of the storage bin without sacrificing the storage capacity of the storage bin.

It is important to note that the construction and arrangement of the various embodiments of the overhead console and method supporting a user interface and/or light source within an overhead console provided herein is illustrative only. Although only a few exemplary embodiments of the present inventions have been described in detail in this disclosure, those skilled in the art who review this disclosure will readily appreciate that many modifications are possible in these embodiments (such as variations in shape and size of the housing, user interfaces, light sources; location, orientation or positioning of the user interfaces and/or light sources; different types of functional devices supported by or integrated into the overhead console; different types of solid state switching; various locations for mounting within the vehicle; location, configuration and engagement patterns of the mounting surfaces and mounting structure, etc.) without materially departing from the novel teachings and advantages of the inventions. Further, elements shown as integrally formed may be constructed of multiple parts or elements, the position of elements may be reversed or otherwise varied, and the nature or number of discrete elements or positions may be altered or varied. Further, the overhead console and method supporting a user interface and/or light source within an overhead console may be used in any type of vehicle such as trucks, recreational vehicles, minivans, sport utility vehicles, passenger automobiles, etc. and at any suitable location within the vehicle. Accordingly, all such modifications are intended to be within the scope of the inventions.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed herein.

What is claimed is:

1. An interior vehicle component comprising:
 a base;
 a panel coupled to the base and moveable between a first position and a second position, the panel having a first side and an opposite second side, the first side configured to be visible to a vehicle occupant when the panel is in the first position, the second side cooperating with the base to define a cavity;
 a solid state switch integrated with or into the panel;
 an indicator to indicate a zone for operating the solid state switch; and
 a flexible circuit coupled to a backside of the solid state switch.

2. The interior vehicle component of claim 1, further comprising a light source integrated with or into the panel.

3. The interior vehicle component of claim 1 further comprising a printed circuit board supported by the base at a location remote from of the solid state switch, the flexible circuit comprising a cable extending between the printed circuit board and the solid state switch.

4. The interior vehicle component of claim 3 wherein the printed circuit board is supported on a backside of the base, the base defining an aperture through which the cable is routed to the backside of the solid state switch.

5. The interior vehicle component of claim 1 wherein the flexible circuit comprises a printed circuit board that is supported at the backside of the solid state switch.

6. The interior vehicle component of claim 1 wherein a combination of the panel, of the solid state switch, and the flexible circuit has a total thickness that is less than approximately 10 mm 7. The interior vehicle component of claim 6 wherein the total thickness of the combination is less than approximately 5 mm.

8. The interior vehicle component of claim 1 wherein the interior vehicle component comprises at least one of an overhead console, floor console, door panel and a visor.

9. The interior vehicle component of claim 8 wherein the interior vehicle component comprises an overhead console, and wherein the cavity is a storage bin.

10. The interior vehicle component of claim 9 wherein the storage bin is configured to receive and retain a pair of sunglasses.

11. The interior vehicle component of claim 9 wherein panel is pivotally coupled to the base about a pivot shaft that allows for rotational movement of the panel between the first position and the second position.

12. The interior vehicle component of claim 9 wherein the combination of the flexible circuit, the solid state switch, and the indicator does not encroach upon a storage capacity of the storage bin.

13. The interior vehicle component of claim 9 further comprising a covering provided at the second side of the panel and disposed over the flexible circuit and the solid state switch.

14. A method of manufacturing an interior vehicle component, the method comprising:
   providing a base;
   coupling a panel to the base in a manner so that the panel can be selectively moved between a stowed position and a deployed position, the panel having a first side and an opposite second side, the first side configured to be visible to a vehicle occupant when the panel is in the stowed position, the second cooperating with the base to define a cavity;
   integrating a solid state switch with or into the panel;
   providing an indicator to indicate a zone for operating the solid state switch; and
   coupling a flexible circuit a backside of the solid state switch.

15. The method of claim 14 wherein the interior vehicle component is an overhead console.

16. The method of claim 14, further comprising integrating a light source with or into the panel.

* * * * *